United States Patent [19]
Preisler et al.

[11] Patent Number: 6,082,762
[45] Date of Patent: Jul. 4, 2000

[54] AIR BAG COVER HAVING A DECORATIVE APPLIQUE PREFORM BONDED THERETO AND METHOD OF MAKING SAME

[75] Inventors: Darius J. Preisler, Macomb; Jason T. Murar, Clinton Township, both of Mich.

[73] Assignee: Larry J. Winget, Leonard, Mich.

[21] Appl. No.: 09/144,159

[22] Filed: Aug. 31, 1998

Related U.S. Application Data

[63] Continuation-in-part of application No. 09/083,943, May 22, 1998.

[51] Int. Cl.$^7$ .................................................. B60R 21/22
[52] U.S. Cl. ........................................ 280/731; 280/728.3
[58] Field of Search ................................ 280/731, 728.3, 280/728.2

[56] References Cited

U.S. PATENT DOCUMENTS

| | | | |
|---|---|---|---|
| 3,774,932 | 11/1973 | Schiesterl | 280/731 |
| 3,819,205 | 6/1974 | Dunford et al. | 280/731 |
| 4,769,100 | 9/1988 | Short et al. | |
| 4,902,557 | 2/1990 | Rohrbacher | |
| 4,952,351 | 8/1990 | Parker et al. | |
| 5,277,442 | 1/1994 | Cuevas | 280/731 |
| 5,466,412 | 11/1995 | Parker et al. | |
| 5,487,557 | 1/1996 | Eckhout | |
| 5,529,336 | 6/1996 | Eckhout | |
| 5,678,851 | 10/1997 | Saito et al. | 280/731 |
| 5,765,864 | 6/1998 | Winget | 280/731 |
| 5,979,931 | 11/1999 | Totani et al. | 280/731 |

*Primary Examiner*—Kenneth R. Rice
*Attorney, Agent, or Firm*—Brooks & Kushman P.C.

[57] ABSTRACT

An automotive air bag cover is provided having a decorative applique preform bonded thereto completely about a pair of flap portions of a front panel of the cover. The air bag cover is manufactured from plastic and the front panel is adapted to enclose an uninflated automotive air bag. The front panel includes inner and outer surfaces. Side panels are further provided and are connected to and extend rearwardly from the front panel. The decorative applique preform is bonded to the entire outer surface of the front panel except for the flap portions. Seams are provided for permitting the air bag to inflate and exit the front panel. The decorative applique preform is bonded to the front panel adjacent the seams in a non-overlapping fashion such that the decorative applique preform does not interfere with exit or inflation of the air bag.

7 Claims, 3 Drawing Sheets

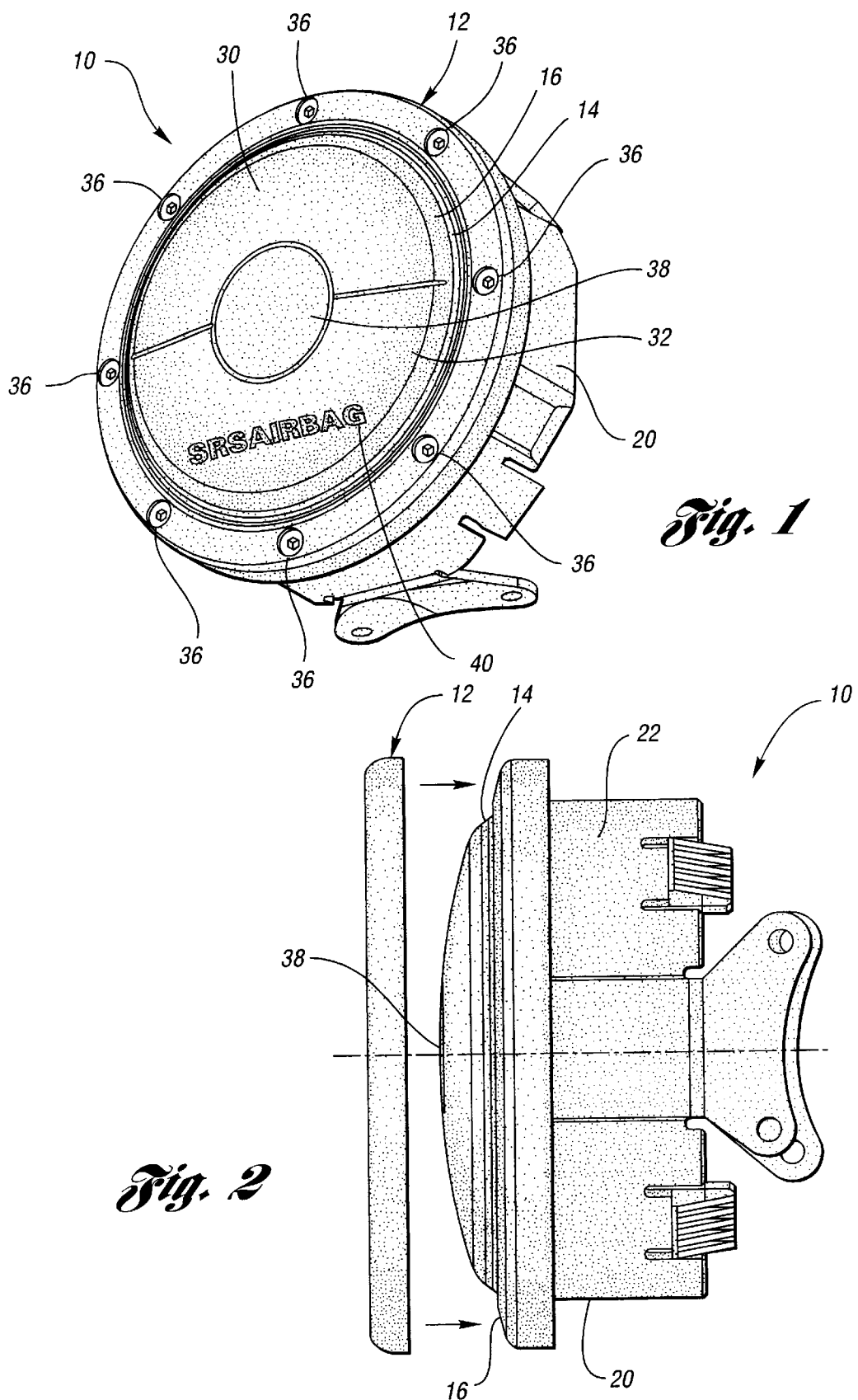

AIR BAG COVER HAVING A DECORATIVE APPLIQUE PREFORM BONDED THERETO AND METHOD OF MAKING SAME

CROSS-REFERENCE TO RELATED APPLICATION

This application is a continuation-in-part application of application Ser. No. 09/083,943, filed May 22, 1998.

TECHNICAL FIELD

This invention relates to air bag covers having decorative appliques bonded thereto.

BACKGROUND ART

Presently, when air bag covers are provided in automobiles on the driver's side of the vehicle, the air bag is stored in the steering column behind an air bag cover. During automatic inflation of the air bag, the air bag cover moves away from the steering column to permit its safety function between the steering column and the operator of the vehicle.

Recent practice in the automotive industry is utilization of all plastic fabricated air bag covers. It is known in other automotive parts areas that different, aesthetically pleasing outer surfaces enhance the overall appearance of the interior of automotive vehicles. Use of decorative appliques having solid colors contrasting or blending with the different colors of the plastic air bag covers is often sought after. Simulated wood grain finishes, and metallic finishes are also popular and economically feasible in combination with various plastic automotive parts.

Difficulties are known to arise in properly applying applique films to annular or arcuate plastic outer surfaces. Applique films are usually approximately 0.5 millimeters thick or less and are therefore not easily applied directly to an outer air bag cover surface. Improper application causes small air pockets to occur on the decorative film which often makes the resultant air bag cover, unattractive and thus unusable. Additionally, conventional air bag covers invariably include annular or arcuate surfaces, and affixing the thin applique film to these designated surfaces is even more difficult.

The deposition or fastening of the applique must be perfected with a method that affords a smooth surface and neat appearance. Thus it is known to utilize a backing material or liner in conjunction with a thin applique film to afford a clean, smooth appearance of the final product.

In addition, the applique must be affixed to the front cover in such a way as to prevent the applique from separating from the front cover when the air bag explodes. The applique must therefore be bonded to the front cover with sufficient strength to prevent fragmentation of the applique during air bag inflation and exit.

The U.S. Pat. Nos. to Eckout 5,487,557 and 5,529,336 disclose an automotive air bag cover having a decorative applique fastened thereto. The air bag cover is manufactured from plastic and includes a front panel adapted to enclose an uninflated automotive air bag. The front panel includes inner and outer surfaces. Side panels are further provided and are connected to and extend from the front panel. The decorative applique is fastened to the outer surface of the front cover by a plurality of connecting towers which extend through the front cover. Seams are provided for permitting the air bag to inflate and exit the front cover. The decorative applique is fastened to the front cover adjacent the seams in a non-overlapping fashion such that the decorative applique does not interfere with exit or inflation of said air bag.

Typically, plastic parts are painted after they are molded. The painting process requires elaborate facilities and consequently necessitates large expenses. For instance, significant square footage of a factory must be dedicated to a clean room environment for the spraying of paint and clear coat and for the baking and curing of paint on components, such as those components used in the automotive industry, such as body panels, air bag covers, instrument panels and the like. Moreover, solvent-based paints have in recent years raised significant environmental concerns because of the volatile organic components which are emitted into the air during the application of such solvent-based paints. As a result, the evaporation of such solvents must be strictly monitored to satisfy environmental and safety regulations.

In addition, automotive components, especially interior automotive components, are strictly scrutinized following the painting process in order to match or conform the automotive component to the styling and aesthetic requirements of the associated interior trim product. Painting such automotive components following the molding process, raises quality concerns with respect to the color, consistency, and thickness of each individual paint application.

U.S. Pat. No. 4,902,557 to Rohrbacher discloses a method and apparatus for manufacturing a thermoplastic polyolefin composite useful as an exterior auto or truck body part.

U.S. Pat. No. 4,769,100, the Short reference, teaches a method of applying a carrier film pre-printed with metallic paint to an automobile body panel in a vacuum forming process.

U.S. Pat. No. 4,952,351 and U.S. Pat. No. 5,466,412, the Parker patents, teach a method of manufacturing an air bag cover for an inflatable air bag system including a bondable film carrier, which is painted after the film carrier is molded.

However, despite the above prior art there is a need to provide a "rich" (i.e. painted, glossy) look to the front panel of an air bag cover that is easier, cheaper and "greener" to manufacture yet not interfere with exit or inflation of the air bag.

DISCLOSURE OF INVENTION

An object of the present invention is to provide an automotive air bag cover having a decorative applique bonded thereto completely about at least one flap portion of a front panel of the cover to satisfy the above need and method of making same.

In carrying out the above object and other objects of the present invention, an automotive air bag cover constructed in accordance with the present invention is provided. The air bag cover includes a plastic front panel adapted to enclose an uninflated automotive air bag and having at least one flap portion including a hinge and an edge through which the air bag exits. The front panel further has inner and outer surfaces. The outer surface has a receiving portion disposed adjacent to and completely about the at least one flap portion. The cover also includes a seam formed in the surface of the front panel for permitting the air bag to deploy. The seam defines the edge of the at least one flap portion of the front panel and is formed in a non-overlapping fashion with the receiving portion. The air bag cover further includes a decorative applique preform bonded to the receiving portion of the outer surface completely about the at least one flap portion in a completely non-overlapping fashion with the seam such that upon inflation or exit of the air bag, the at least one flap portion moves away from the decorative applique preform which does not detach from the front panel or interfere with the air bag.

Still further in carrying out the above object and other objects of the present invention, a method is provided for making a molded plastic automotive air bag cover having a decorative applique. The method includes the step of providing a thin film having top and bottom surfaces. The thin film is selected from the group consisting of polyester, polyurethane and polycarbonate. The method also includes the step of vacuum forming the film sheet in a mold cavity to obtain a preform. The method further includes the step of cutting the preform to form a decorative applique preform having a central aperture which extends completely therethrough. The method also includes the step of placing the decorative applique preform in a mold cavity of an injection mold having a shape defining an automotive air bag cover including a front panel with at least one flap portion. The method then includes the step of injecting a thermoplastic elastomer into the mold cavity of the injection mold to generate the rest of the air bag cover wherein the decorative applique preform is disposed adjacent to and completely about the at least one flap portion. The generation of the rest of the air bag cover creates sufficient pressure and heat to bond the rest of the air bag cover to a bottom surface of the decorative applique preform to form the molded plastic air bag cover having the decorative applique.

Yet still further in carrying out the above object and other objects of the present invention, an automotive air bag cover is provided. The cover includes a front panel for enclosing an uninflated air bag. The front cover has at least one flap portion including a hinge and an edge through which the air bag exits. The front panel has inner and outer surfaces. The outer surface has a receiving portion disposed adjacent to and completely about the at least one flap portion. A seam is formed in the surface of the front cover for permitting the air bag to deploy. The seam defines an edge of the at least one flap portion and is formed in a non-overlapping fashion with the receiving portion. The air bag cover also includes a decorative applique preform bonded to the receiving portion completely about the at least one flap portion and in a completely non-overlapping fashion with the seam such that upon exit of the air bag, the at least one flap portion moves away from the decorative applique preform which does not detach from the front panel or interfere with the air bag.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 1 is a front perspective view of an air bag cover constructed in accordance with the present invention;

FIG. 2 is a side elevational exploded view of an air bag cover and a decorative applique preform;

BEST MODE FOR CARRYING OUT THE INVENTION

Figure 3:
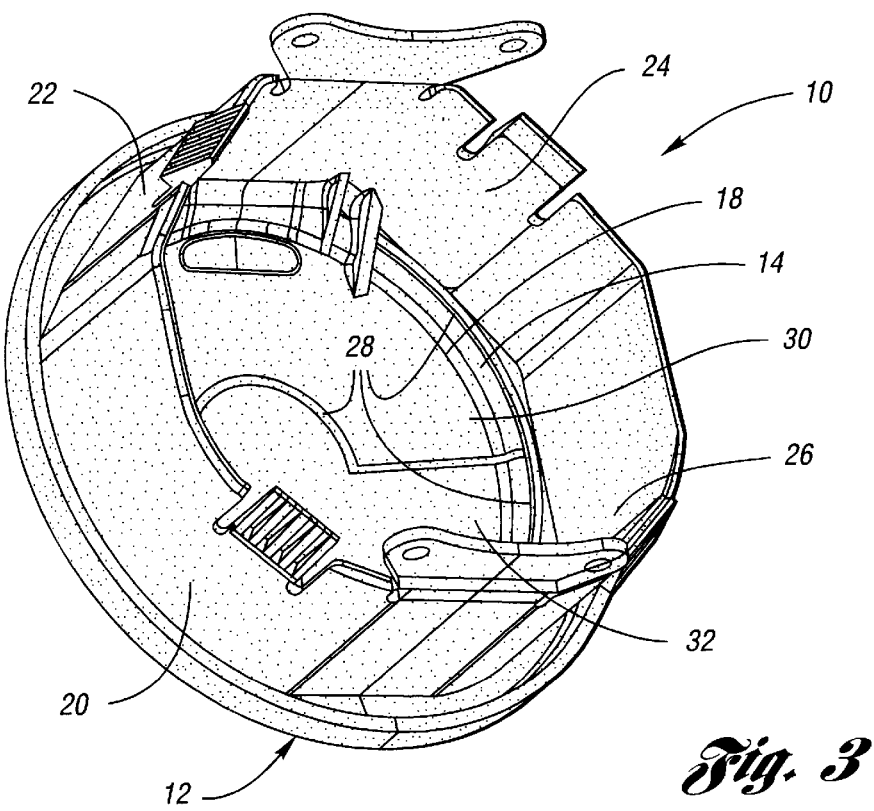
FIG. 3 is a rear perspective view of the air bag cover of the present invention.
Figure 4:
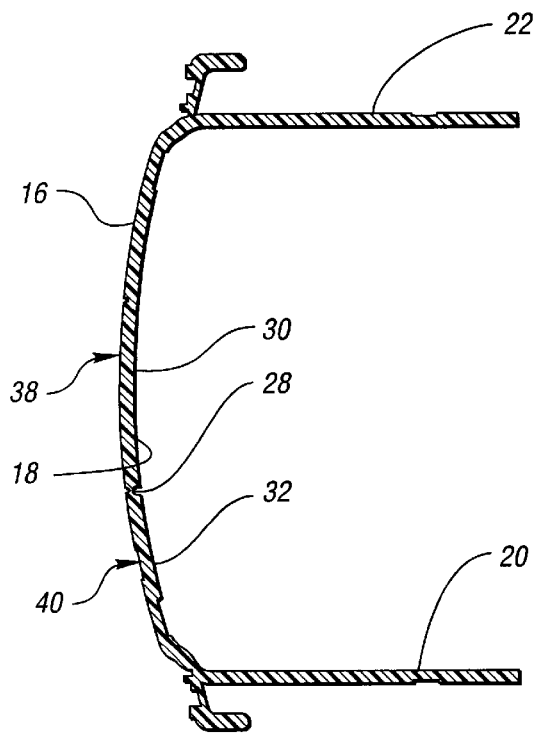
FIG. 4 is a side sectional view of the air bag cover.

Referring now to the drawing figures, and in particular to FIGS. 1–4, an air bag cover constructed in accordance with the present invention is generally shown at 10. The cover 10 includes a decorative applique preform, generally indicated at 12, bonded to a front panel 14 of the cover 10. The front panel 14 has an arcuate outer surface 16 and an inner surface 18. Side panels 20, 22, 24 and 26 extend rearwardly from the front panel 14.

A thermoplastic elastomer of the cover 10 is preferably a thermoplastic elastomer such as a thermoplastic polyolefin, thermoplastic urethane, polyester, polycarbonate, a mixture of polycarbonate and ABS (acrylonitrile/butadiene/styrene) or similar material. The air bag cover 10 may be manufactured from a flexible thermoplastic material such as commercially available "Santoprene" 201-87 provided by Advanced Elastomers Systems of Auburn Hills, Mich.

A continuous seam 28 is shown in FIG. 3 extending around the perimeter of the inner surface 18 and across the inner surface 18 of the air bag cover 10. An uninflated air bag (not shown) is located directly adjacent the inner surface 18. The air bag cover 10 is designed to enclose the uninflated air bag and is usually positioned upon the steering wheel (not shown) of the automotive vehicle.

The decorative applique preform 12 may be a contemporary decorative applique having wood grain simulations, a chromed or silvered surface or a textured surface. The decorative applique preform 12 is a thin membrane composite having a thickness of less than 0.5 millimeters.

Figure 5:
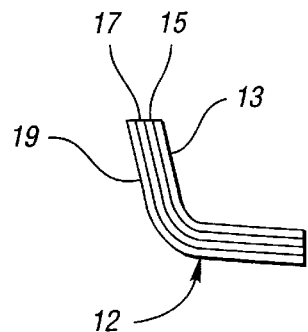
FIG. 5 is a sectional view illustrating the multiple layers of the preform.

Referring to FIG. 5, the preform 12 preferably includes a film sheet 13 that is pre-painted. The film sheet 13 is preferably a polyester sheet such as Mylar®, a polyurethane or polycarbonate sheet.

The front panel 14 may be formed from thermoplastic polyolefin, polycarbonate, tee tpe, sebs tpe, and a mixture of polycarbonate and acrylonitrile/butadiene/styrene (ABS). The corresponding film layer 13 must be compatible with the plastic of the front panel 14 so that diffusion between contact surfaces occurs in the method of the present invention as described hereinbelow.

Referring again to FIG. 5, the preform 12 preferably includes the film sheet 13 with the following coatings placed thereon, a layer 15 of acrylic color in mating contact with the film sheet 13 and a layer 17 of polyvinylidine fluoride (PVDF) with an acrylic clear coat 19 to protect the film from damage and to provide film elasticity, chemical resistance, stain resistance, weathering and UV protection. In the most preferred embodiment, PVDF comprises 72% of the total preform thickness which is 0.2 mils.

The durometer and elastic or flex modulus of the cover 10 may vary depending on the desired stiffness of the component. Typically, the durometer of the front panel 14 will be in the range of about 20 Shore D to 100 Shore D, while the flexural modulus will be in the range of about 15,000 to about 400,000 psi. Also, typically, the durometer of the preform 12 will be in the range of about 15 Shore A to 100 Shore A. These ranges of course vary depending on the desired plastic component to be manufactured and are only illustrative of one example.

The unique features of the preform components or layers are 1) a stiff inner material to support the intended application; 2) reduction and/or elimination of paint problems such as drips, runs, spits, dry spray, light coverage and gloss and improved color match and paint adhesion; 3) reduced molding scrap due to splay, flow marks and minor surface imperfections, which can be completely covered; and 4) increased durability of the resulting plastic laminate components.

Referring again to FIGS. 1 and 3, the decorative applique preform 12 is shown bonded to the air bag cover 10. The decorative applique preform 12 is disposed adjacent the seam 28 in a non-overlapping fashion to prevent any interference of preform 12 with inflation or exit of the air bag upon operation. The decorative applique preform 12 is therefore located sufficiently away from the seam 28 such that the attendant explosive effect that occurs upon inflation and exit of the air bag will move separable front flap portions 30 and 32 away from the decorative applique preform 12. The flap portions 30 and 32 act as live hinges when air bag inflation and exit occurs.

It is known that decorative appliques enhance the appearance of conventional automotive parts. Air bag covers are currently designed to accommodate the overall appearance of the inside of the particular automobile. In furtherance of improving the aesthetic appeal of air bag covers, the present invention combines the pleasing visual characteristics of decorative appliques with the functional aspects of air bag covers. FIG. 1 illustrates air bag cover 10 having a preform 12 with a brushed metal or "rich" (painted, glossy) look with raised design portions in the form of matt black screw heads 36. The screw heads 36 either form an integral part of the preform 12 or, alternatively, may be part of the front panel 14 if holes are cut in the preform 12 prior to the step of injecting the plastic as noted below.

Air bag cover 10 provides a decorative appearance by the addition of the decorative applique preform 12 without effecting the operable conditions of the air bag cover 10. The decorative applique preform 12 is bonded to the air bag cover 10 with sufficient strength and at a location such that the preform 12 will not affect the inflation and subsequent exit of the inflating air bag from the cover 10.

The front panel 14 also includes a recessed area 38 for a logo and recessed graphical indicia 40.

Figure 6:
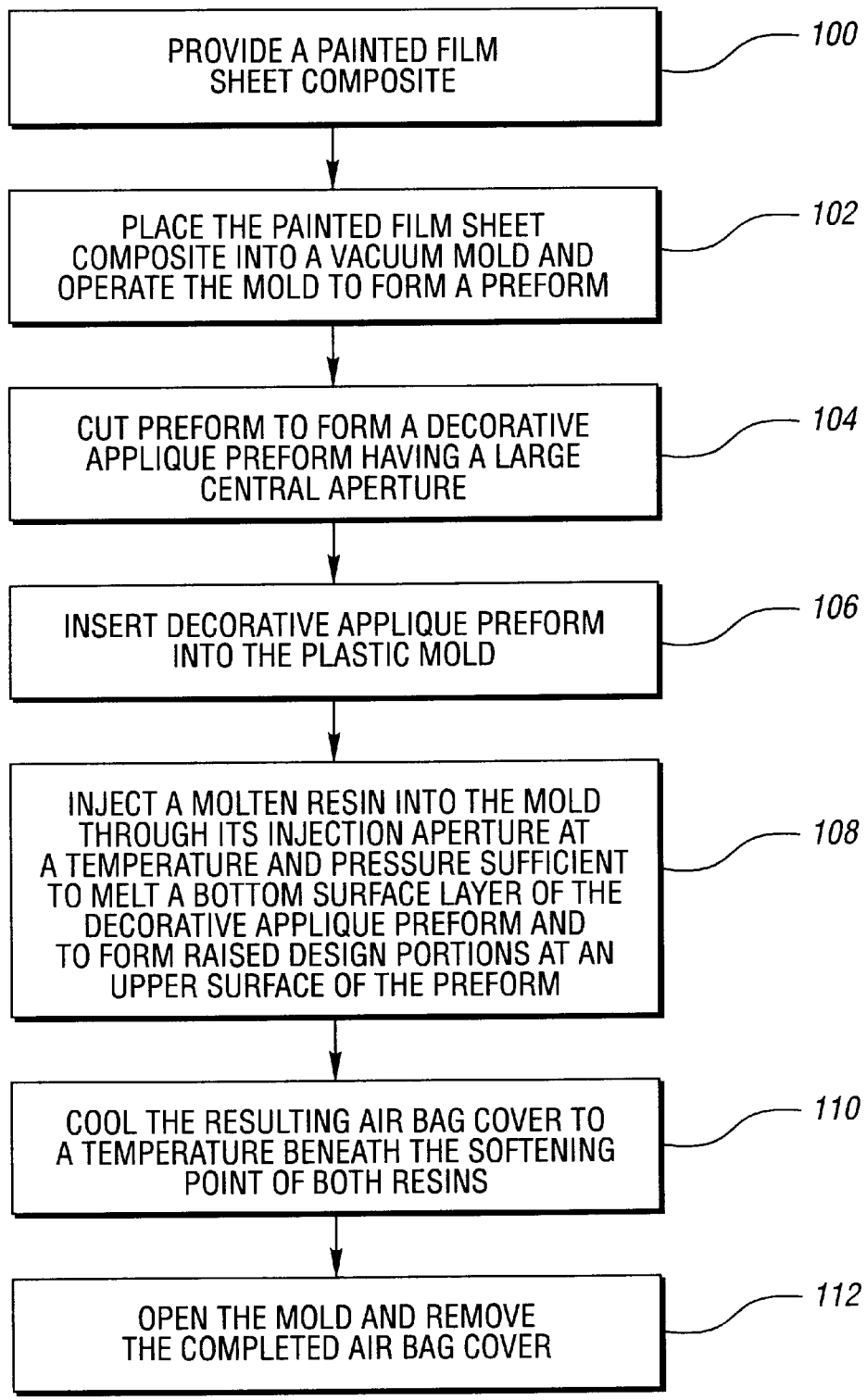
FIG. 6 is a block diagram flow chart illustrating method steps for forming the air bag cover.

Referring now to FIG. 6, there is illustrated in block diagram flow chart form various method steps for forming the air bag cover 10 of the present invention.

At block 100, a painted film sheet composite is initially provided.

At block 102, the painted film sheet composite is placed in a vacuum mold which is operated to form a preform.

At block 104, after the preform has been removed from the vacuum mold, the preform is cut to form the decorative applique preform 12 having a central aperture. In one embodiment, peripherally spaced holes are also cut in the preform 12 to allow molten plastic to form the screw heads 36 during the step of injecting as noted below.

At block 106, the decorative applique preform 12 is inserted into a plastic mold.

At block 108, molten plastic is injected into the mold through its injection aperture at a temperature pressure sufficient to melt the bottom surface layer 13 of the decorative applique preform 12 and to form the raised design portions 36 at an upper surface of the preform 12. In one embodiment, the molten plastic pushes the preform 12 which forms the screw heads 36. In another embodiment, the molten plastic flows through holes previously cut in the preform 12 to form the screw heads 36.

At block 110, the resulting air bag cover 10 is cooled to a temperature beneath the softening point of both resins.

At block 112, the mold is opened and the completed air bag cover 10 is removed.

While the best mode for carrying out the invention has been described in detail, those familiar with the art to which this invention relates will recognize various alternative designs and embodiments for practicing the invention as defined by the following claims.

What is claimed is:

1. An automotive air bag cover comprising:

a plastic front panel adapted to enclose an uninflated automotive air bag and having at least one flap portion including a hinge and an edge through which the air bag exits, the front panel further having inner and outer surfaces, the outer surface having a receiving portion disposed adjacent to and completely about the at least one flap portion;

a seam formed in a surface of the front panel for permitting the air bag to deploy, the seam defining the edge of the at least one flap portion of the front panel and is formed in a non-overlapping fashion with the receiving portion; and a decorative applique preform bonded to the receiving portion of the outer surface completely about the at least one flap portion and in a completely non-overlapping fashion with the seam such that upon inflation or exit of the air bag, the at least one flap portion moves away from the decorative applique preform which does not detach from the front panel or interfere with the air bag.

2. The automotive air bag cover as in claim 1 wherein said decorative applique preform comprises a plastic film sheet compatible with the plastic of the front panel so that diffusion occurs between the plastic film sheet and the receiving portion of the outer surface of the front panel, the plastic film sheet being shaped correspondingly to the outer surface of the front panel.

3. The automotive air bag cover as claimed in claim 2 wherein the plastic film sheet is coated with a layer of acrylic color and polyvinylidine fluoride and an acrylic clear coat layer.

4. The automotive air bag cover as claimed in claim 1 wherein the front panel includes a pair of flap portions and wherein the preform is bonded to the receiving portion of the outer surface completely about the pair of flap portions.

5. The automotive air bag cover as claimed in claim 4 wherein the pair of flap portions and the receiving portion define substantially all of the front panel.

6. The automotive air bag cover as claimed in claim 1 wherein the preform includes raised design portions formed at an upper surface thereof.

7. An automotive air bag cover comprising a front panel for enclosing an uninflated air bag, the front cover having at least one flap portion including a hinge and an edge through which the air bag exits, the front panel having inner and outer surfaces, the outer surface having a receiving portion disposed adjacent to and completely about the at least one flap portion, a seam formed in a surface of the front cover for permitting the air bag to deploy, the seam defining the edge of the at least one flap portion and being formed in a non-overlapping fashion with the receiving portion, and a decorative applique preform bonded to the receiving portion completely about the at least one flap portion and in a completely non-overlapping fashion with the seam such that upon exit of the air bag, the at least one flap portion moves away from the decorative applique preform which does not detach from the front panel or interfere with the air bag.

\* \* \* \* \*